United States Patent [19]

Cunningham

[11] 4,246,678
[45] Jan. 27, 1981

[54] ANIMAL FEEDER

[75] Inventor: Gordon R. Cunningham, Hector, Minn.

[73] Assignee: Anna E. Cunningham, Hector, Minn.; a part interest

[21] Appl. No.: 12,345

[22] Filed: Feb. 15, 1979

[51] Int. Cl.³ .............................................. A01K 5/00
[52] U.S. Cl. ..................................................... 119/54
[58] Field of Search .................... 119/52 R, 52 A, 53, 119/54

[56] References Cited

U.S. PATENT DOCUMENTS

| | | | |
|---|---|---|---|
| 1,121,502 | 12/1914 | Hornbeck | 119/52 A |
| 1,311,696 | 7/1919 | Hornbeck | 119/52 A |
| 1,337,436 | 4/1920 | Buth | 119/54 |
| 1,818,419 | 8/1931 | Miller | 119/52 A |
| 2,544,578 | 3/1951 | Winkler | 119/54 |
| 2,744,497 | 5/1956 | Fisher et al. | 119/53 |
| 2,842,096 | 7/1958 | Bradfield | 119/52 R |
| 2,858,801 | 11/1958 | Chance | 119/52 R |
| 2,914,024 | 11/1959 | Hobbs | 119/54 |
| 2,961,695 | 11/1960 | Fradd | 16/179 |
| 2,974,634 | 3/1961 | Williams et al. | 119/53 X |
| 3,035,545 | 5/1962 | Mayo | 119/52 R |
| 3,144,001 | 8/1964 | Robinson, Jr. et al. | 119/53 |
| 3,256,972 | 6/1966 | Wilkes | 198/64 |
| 3,291,281 | 12/1966 | Midtbo et al. | 198/64 |
| 3,951,107 | 4/1976 | Doty | 119/52 R |

Primary Examiner—F. Barry Shay
Assistant Examiner—Robert P. Swiatek
Attorney, Agent, or Firm—Kinney, Lange, Braddock, Westman & Fairbairn

[57] ABSTRACT

An animal feeding apparatus for the holding and delivery of feed to animals. The apparatus includes a feed hopper with two inwardly sloping walls and a flow diverter at the bottom of the hopper, splitting and diverting the flow of feed to each of two feeding troughs. The flow diverter extends along the entire length of the feed hopper, being formed by the junction of the rear sloping wall of each feeding trough. The two feeding troughs, extending the entire length of the feeder, are on opposite sides to each other and have a horziontal base portion, a sloping upward rear portion and a sloping upward front portion whose edge is bent back forming a safety edge. Each feeding trough has a plurality of agitators that extend horizontally into the feeding trough and vertically into the feed hopper. The animals through their feeding motion move the agitators which in turn loosen feed in the feed hopper. Individually adjustable feed gates above each agitator control the amount of feed flow.

7 Claims, 3 Drawing Figures

U.S. Patent    Jan. 27, 1981    4,246,678
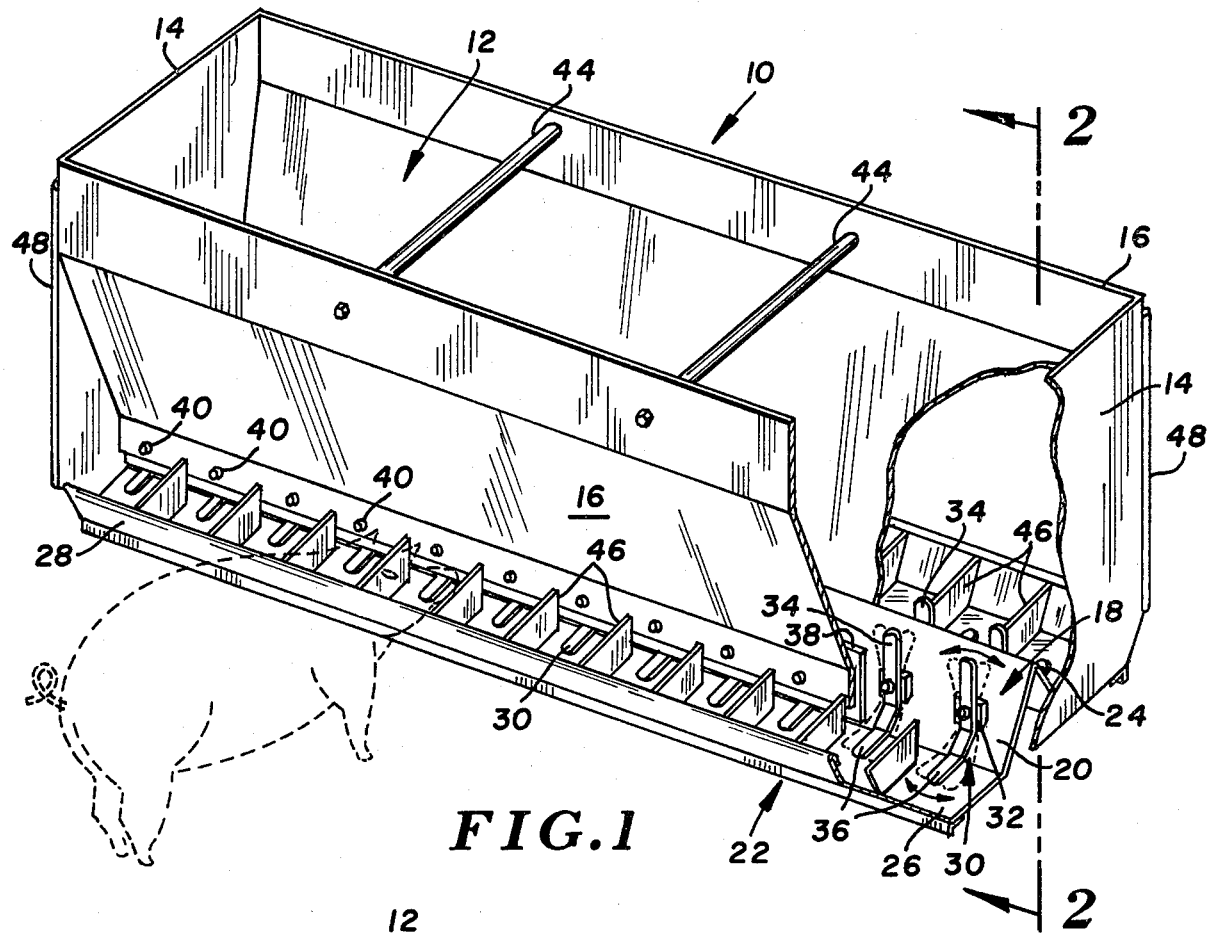
FIG.1
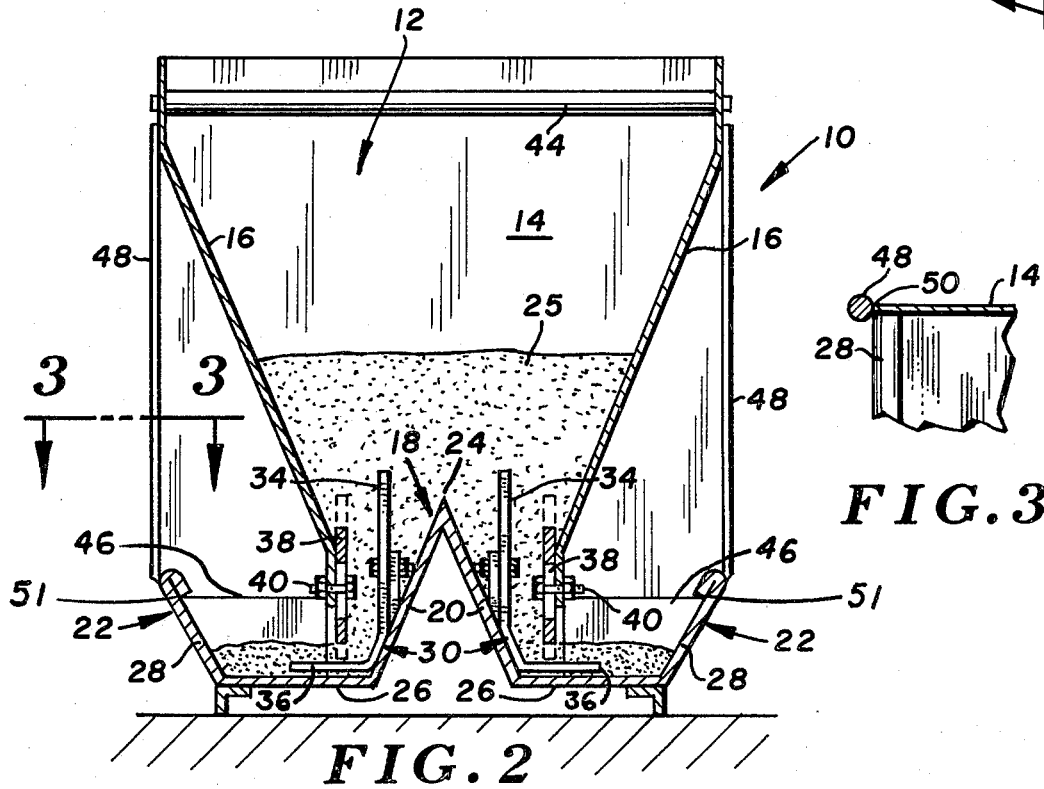
FIG.2
FIG.3

ANIMAL FEEDER

BACKGROUND OF THE INVENTION

1. Field of the invention

The present invention relates to animal feeders and more particularly to animal feeders having a feed flow controlled by agitation and feed gates.

2. Description of the Prior Art

It is quite desirable to have an animal feeder that automatically controls the flow of feed to the animal while it is eating. One such prior art feeder is described in the Doty patent, U.S. Pat. No. 3,951,107. This patent shows an agitator operated by the animal while it is feeding. The animal with its head in the feeding trough, abuts the swingable front partition with its head and brushes against a divider bar that extends into the feed hopper, loosening feed so that it drops into the feed trough. This type of agitator, however, has a number of problems. First, it relies upon the animal's side-to-side movement against the divider bar to ensure a constant flow of feed. Secondly, the divider bar pivots through a hole in the swingable partition which swings back and forth from the feeding trough. Thus, in the event of a very hungry animal, the swingable partition may be pushed all the way back against the upper portion of the divider bar and both members will have little effect in agitating the feed. If no feed flows, the animal will just push harder and harder against the partition, and defeat the agitating function of the front partition and divider bar.

The present invention provides a solution to this problem. First, it has an agitator that is activated by the animal through his act of feeding. The agitator is close to the bottom of the feeding trough so as to ensure that the animal will first eat what is in its trough, then activate the agitator to induce more feed to flow into the trough. Second, the agitator also has an upper portion that extends into the feed hopper and is always fixedly spaced from the feed hopper walls in order to ensure maximum efficiency in agitation.

SUMMARY OF THE PRESENT INVENTION

The present invention is a feeding apparatus that holds and delivers feed to animals in a controlled manner. By providing a controlled flow of feed, spoilage is minimized and labor is saved.

The present invention includes a feed hopper, a flow diverter at the bottom of the hopper, at least one feeding trough, an agitator, and a slidable feeding gate. In the preferred embodiment, the present invention contains two feeding troughs and the feed hopper has two inwardly sloping walls.

The flow diverter, which extends along the entire length of the feed hopper, splits and diverts the flow of feed to the feeding trough. In the case of two feeding troughs, the flow diverter for each feeding trough is joined at a junction at the bottom of the feed hopper, forming a point where the flow of feed is split or diverted to each of the respective feeding troughs.

Each feeding trough of the present invention uses a plurality of agitators that extend horizontally into the feeding trough. This horizontal portion of the agitator is closely adjacent to the horizontal base of the feeding trough. This requires the animal to eat what is first in the trough and then if it is still hungry to move the agitator and cause the feed to flow into the trough. The upper portion of the agitator extends into the feed hopper. This portion is fixedly spaced to be in the main flow of feed to optimize its agitation efficiency.

Adjustable feed gates above each agitator also control the amount of feed flowing into each trough and the level therein. In one preferred embodiment, there are also rigid partitions separating the agitators from each other and forming feeding compartments in the trough.

BRIEF DESCRIPTION OF THE DRAWINGS

FIG. 1 is a perspective view of the animal feeding apparatus of the present invention;

FIG. 2 is a cross-sectional side elevational view of the animal feeding apparatus of the present invention taken along the line 2—2 of FIG. 1; and FIG. 3 is a fragmentary cross-sectional view taken along the line 3—3 of FIG. 2.

DETAILED DESCRIPTION OF THE PREFERRED EMBODIMENTS

Referring to FIG. 1, the animal feeding apparatus of the present invention is generally indicated at 10. A feeding hopper is indicated generally at 12 comprising a pair of oppositely opposed vertical end walls 14 and two oppositely opposed relatively flat side walls 16 which are fixedly attached to end walls 14. The walls 16 in the preferred embodiment in FIG. 1 both slope downwardly and inwardly to the bottom of the feed hopper.

A flow diverter shown generally at 18 is positioned at the bottom of the feeding hopper 12 and extends between end walls 14. The flow diverter 18 is composed of the back walls 20 of the feeding troughs generally indicated at 22. The back wall 20 of each feeding trough 22 forms a flow diverter at junction 24. This flow diverter not only directs the flow of feed 25 but splits the flow coming from the feed hopper into the respective feeding troughs 22.

Referring to FIG. 2, the feeding trough comprises a horizontal base 26, an upwardly and outwardly extending front portion 28 and an upwardly and outwardly extending rear portion 20. The feeding trough 22 extends between both end walls 14.

A plurality of agitators generally indicated at 30 are pivotally attached at point 32 to flow diverter 18. Referring to FIG. 2, each agitator is in the form of a flat bar having an upper portion 34 and a lower portion 36 (see FIG. 1). The flat bar is generally L-shaped, as is clearly visible in FIG. 2. The upper portion 34 extends into the feed hopper and is pivotally mounted on a vertical bracket secured to the wall 20 so as to be spaced from the flow diverter 18 for the purpose of optimal agitation efficiency. The lower portion 36 of the agitator 30 is closely adjacent to the horizontal base 26 of the feeding trough 22. This ensures that the animal first eats what is in the feeding trough before agitating more feed to flow into the feeding trough. Contact of the animal with the lower portion tends to cause swinging sidewise movement of the upper portion 34 about the pivotal mounting.

A sliding feed gate 38, extending between sidewalls 14, controls the amount of feed flowing and the level of feed in the trough 22. This feed gate 38 slidably engages the feed side of the lower portion of the inwardly sloping wall 16 of the feed hopper 12, as shown in FIG. 2. This feed gate 38 can be held in place by any number of nuts and bolts 40 or any other suitable fastener which extend through vertical slots in the gate 38 to allow vertical adjustment of the gate.

To support the upper portions of the feed hopper 12, a plurality of rigid spacers 44 extend between walls 16 and provide support for this upper portion of the apparatus. The spacers may be attached to the upper portion of wall 16 by any conventional means, such as a nut applied to the threaded end of each spacer 44 itself.

A plurality of rigid panels 46 are used to compartmentalize each feeding trough 22. Each of these panels 46 extends from the front portion 28 of the feeding trough to the lower portion of wall 16 of each feeding trough 22. These partitions 46 separate the agitators 30 from each other and thus provide an individually controlled feeding area for each animal.

The present invention also incorporates safety features into the feeding apparatus. Referring to FIG. 3, each sidewall 14 has a rod 48 extending the length of the edge 50 of the sidewall and permanently attached to that edge 50 as by welding. This forms a rounded surface and prevents the animals from cutting themselves when they bump into the feeding apparatus. Further, the upward and outward portion 28 of the feeding trough 22 in FIG. 2 has its edge 51 bent back pointing down towards the feed. This again prevents the animals from cutting themselves while eating.

Although the present invention has been described with reference to the preferred embodiment, it should be understood that one skilled in the art will recognize that changes may be made in form and detail without departing from the spirit and scope of the invention.

What is claimed is:

1. An animal feeding apparatus comprising:
a pair of oppositely opposed vertical end walls;
an elongated feed hopper extending between said end walls, said hopper having two oppositely opposed relatively flat sidewalls which are fixedly attached to said end walls, at least one side wall sloping downwardly and inwardly;
a flow diverter means positioned at the bottom of said feed hopper and extending between said end walls, with at least one wall of the diverter means being inclined outwardly from top to bottom;
a feeding trough extending between said end walls, said feeding trough having a substantially horizontal base with an upwardly and outwardly extending front portion and a rear wall formed by said inclined wall of said flow diverter means;
agitator means in the form of a plurality of substantially L-shaped agitator members pivotally attached to said flow diverter means, each agitator member having a rigid upper terminal portion in the form of a flat bar extending substantially vertically into said feed hopper and spaced from the adjacent wall of the diverter means, means pivotally securing said vertical upper portion of the agitator member to said adjacent wall of the diverter means for swinging sidewise movement in the plane of said flat bar, each agitator member further having a lower portion forming a rigid continuation of said upper portion and extending downwardly and outwardly along the contour of the feeding trough and closely adjacent to the bottom of said feeding trough so that an animal coming in contact with said agitator when the trough is substantially empty tends to cause sidewise movement of said lower portion and hence said sidewise movement of said upper portion.

2. An animal feeding apparatus as defined in claim 1 including a first and second feeding trough, flow diverter means having two downwardly diverging walls forming rear walls of said feeding troughs and said feed hopper having two oppositely opposed side walls that are both sloping downwardly and inwardly.

3. An animal feeding apparatus as defined in claim 2 wherein the upper portions of the downwardly and inwardly sloping side walls of the feed hopper have at least one rigid reinforcing spacer extending between said side walls.

4. An animal feeding apparatus as defined in claim 1 wherein the feeding trough is partitioned by a plurality of rigid panels extending from the front portion to the rear portion of said feeding trough and positioned between the lower portions of each and every agitator member.

5. An animal feeding apparatus as defined in claim 1 wherein the feeding trough has a sliding feed gate, said gate being a flat plate extending between said end walls and slidably engaging the feed side of the lower portion of the inwardly sloping side wall of the feed hopper.

6. An animal feeding apparatus as defined in claim 1 wherein each outside vertical edge of both end walls has a rod extending the length of the edge and permanently attached forming a safety edge.

7. An animal feeding apparatus as defined in claim 1 wherein the edge of the upwardly and outwardly extending front portion of the feeding trough is bent back forming a rounded safety edge.

* * * * *